Nov. 6, 1945.    W. L. APPLING    2,388,240
PHOTOGRAPHIC DEVICE
Filed May 8, 1943    3 Sheets-Sheet 1
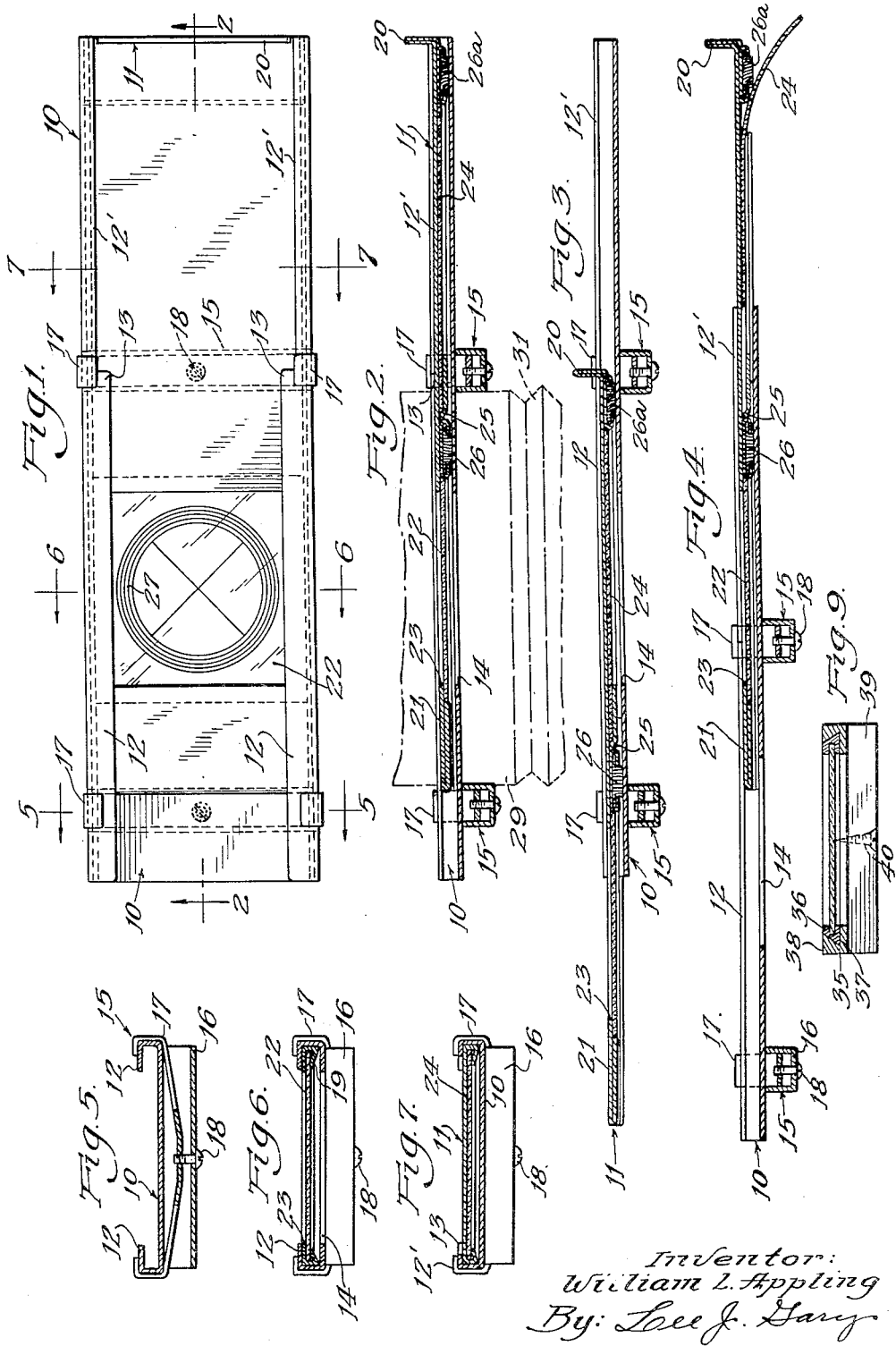
Inventor:
William L. Appling
By: Lee J. Gary
Attorney Nov. 6, 1945. W. L. APPLING 2,388,240
PHOTOGRAPHIC DEVICE
Filed May 8, 1943 3 Sheets-Sheet 2
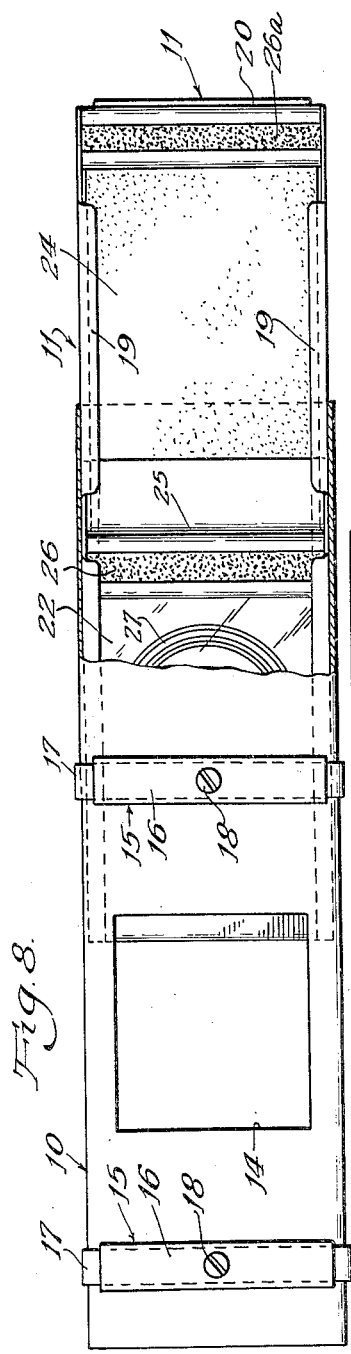
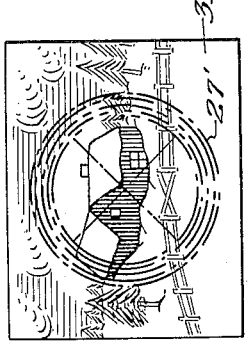
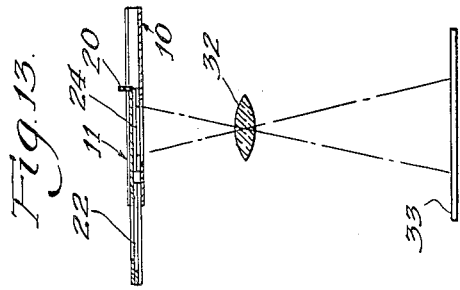
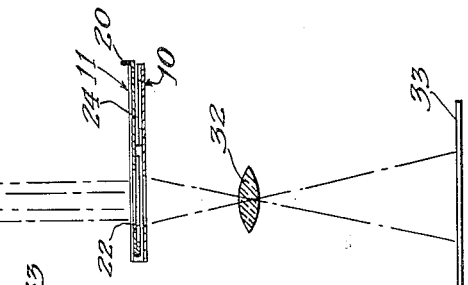
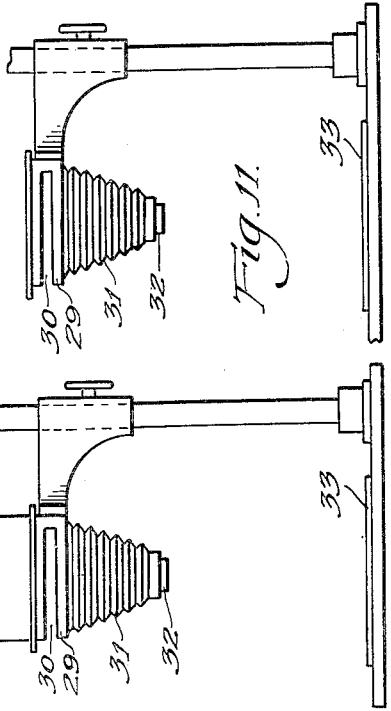
Inventor:
William L. Appling
By: Lee J. Gary
Attorney Nov. 6, 1945. W. L. APPLING 2,388,240
PHOTOGRAPHIC DEVICE
Filed May 8, 1943 3 Sheets-Sheet 3
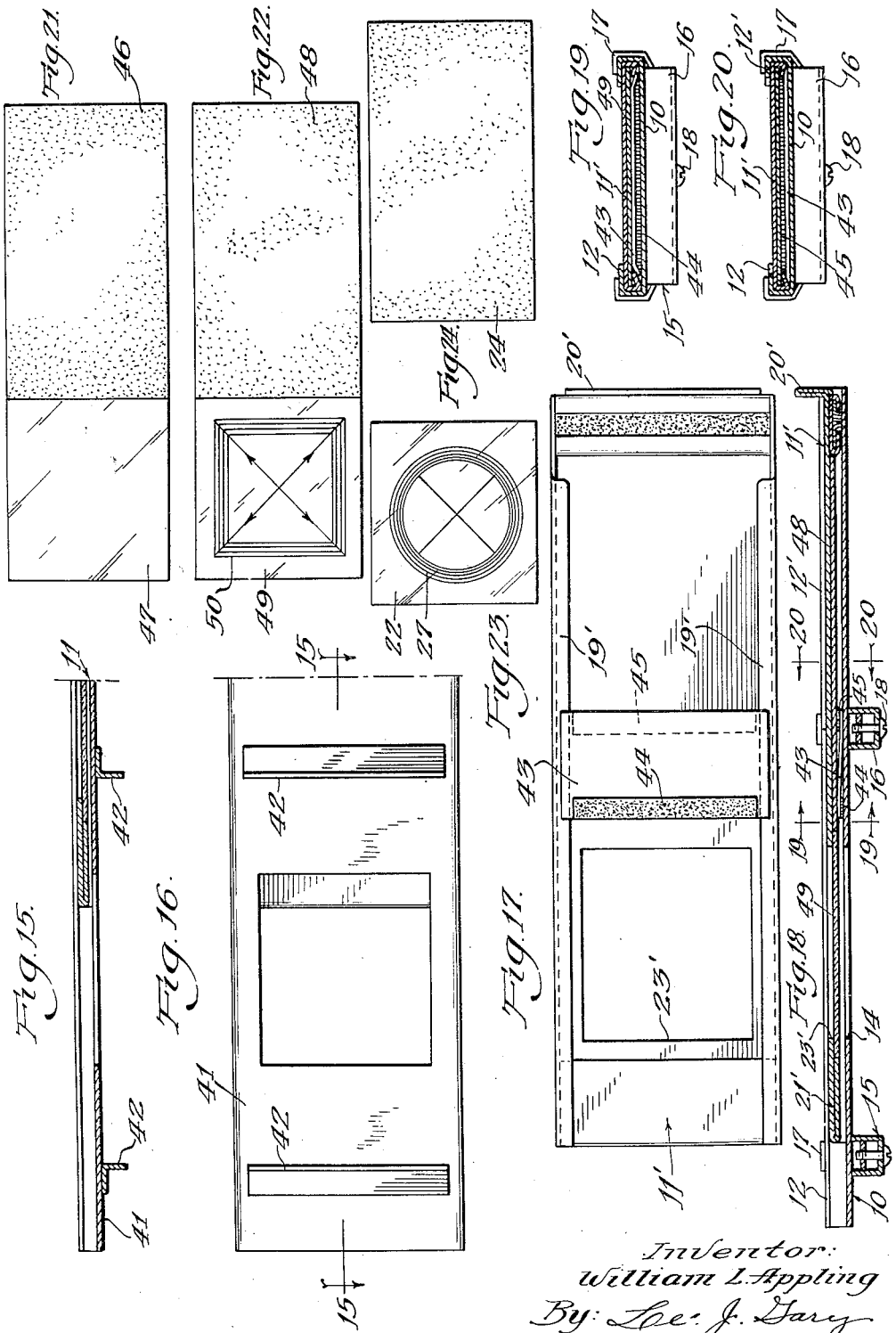

Patented Nov. 6, 1945

2,388,240

UNITED STATES PATENT OFFICE 2,388,240

PHOTOGRAPHIC DEVICE

William L. Appling, Uvalde, Tex.

Application May 8, 1943, Serial No. 486,149

10 Claims. (Cl. 88—24)

This invention relates to a novel photographic device, and particularly to a unitary focus screen and film plate carrying device adapted to be mounted in photographing relationship rearwardly of the lens of an enlarger, projector, copying camera, photographing camera, and the like.

It is a particular object of my invention to provide a device which is conducive to greater accuracy, sharper definition, and simplicity in photographing or photographic copying by providing a relatively economical and easy to operate accessory which includes a slide for carrying a focus screen and film plate in co-planar relationship thereon and between it and a cooperative positioning holder, the whole being of a relatively thin compact construction.

Another object of my invention is the provision of a novel focus screen which may be used under all lighting conditions, and permits by means of a single device the employment of projection focusing for darker conditions and ground glass focusing for lighter conditions.

Another object of my invention relates to a novel form of film or film plate, particularly adapted for use with the device of my invention, and which includes in a unitary piece or strip a focusing screen portion.

One of the uses to which my device is particularly adapted is in the use or conversion of a photographic enlarger or projector into a camera. It is, of course, recognized that any enlarger, magic lantern or projector can "take pictures" if an unexposed film is placed in the same position behind the lens as a slide or developed film is placed to project a picture. Two factors must be considered in making the conversion. The object must be in focus and the unexposed film must be in a light-tight cover, except during the time of exposure, until the film is properly developed. By employment of the device of my invention, which may be termed a "camera slide," consideration of these factors is greatly simplified and expedited.

The camera slide of my invention may be used under all lighting conditions and adapted for a wide variety of photographic devices and conditions. In a simple manner it permits the employment of projection focus for darker conditions on the ground glass focus principle for lighter conditions. My camera slide is so constructed and arranged that the focus screen and unexposed film are carried in exactly the same plane, and are both at hand and ready for instant successive use by a sliding movement in a relatively thin compact device so that it may be positioned within the conventional slide or holder recess of an enlarger or projector, employed with or without the lamp thereof, and without necessity for first employing a focus screen, withdrawing it, and then replacing it with an unexposed film holder as has heretofore been the practice. Such prior methods and devices not only required expert technique and multiple devices but additionally were not capable without extreme care of producing the accurate results and the sharp focusing required in for example, in copying work or short focus photography. By employment of my camera slide device sharp, in focus, and accurate field embracement results may be obtained in a quick and convenient manner even by the relatively inexperienced operator.

In general my device comprises a relatively thin, elongated holder member formed with a sight aperture adjacent one end thereof, the surface area of the opposed end portion being imperforate, and a slide member for slidable engagement with the holder within longitudinal flanges. The slide member is formed with a focus screen aperture adjacent one end adapted to register with the sight opening of the holder, and similarly the opposed end portion is imperforate. The slide includes means for seating a suitable focus screen on its inner face to embrace the aperture, and means for receiving and seating unexposed film over the imperforate end portion, and means for forming a light-tight pocket with the imperforate portion of the holder. The slide, after being filled with unexposed film in a dark room, is adapted to be brought into coextensive engagement with the holder whereby the focus screen aperture is in register with the sight opening of the holder for focusing purposes while the film seating portion forms a light-tight pocket with the adjacent portion of the holder.

Thereafter for the purpose of photographic exposure the slide is moved into non-coextensive engagement whereby the film seating portion is brought into register with the sight opening of the holder, and then returned to coextensive engagement.

Other objects, advantages and important aspects of the invention will be apparent from the following specification and accompanying drawings, wherein:

Fig. 1 is a top plan view of my device with the portions in co-extensive engagement and focusing position, and viewed from the outer face of the slide portion.

Fig. 2 is a longitudinal section on the line 2—2 of Fig. 1.

Fig. 3 is a section similar to that of Fig. 2 but with the slide moved to exposure position.

Fig. 4 is a section similar to that of Fig. 2 but with the slide moved to film loading or discharge position.

Fig. 5 is a transverse section on the line 5—5 of Fig. 1.

Fig. 6 is a transverse section on the line 6—6 of Fig. 1.

Fig. 7 is a transverse section on the line 7—7 of Fig. 1.

Fig. 8 is a bottom plan view of my device with the slide partially extended into the holder, and with part of the holder broken away.

Fig. 9 is a transverse sectional view of a modified form of holder construction.

Fig. 10 is a diagrammatic side elevation of an enlarger.

Fig. 11 is a view similar to that of Fig. 10, but with the lamp housing removed.

Fig. 12 is a schematic illustration of the use of my device in projection focusing.

Fig. 13 is a schematic illustration of the use of my device for view focusing and for photographing.

Fig. 14 illustrates the projection of the geometric design embodied in the ground glass illustrated in Fig. 1, onto an object to be copied or photographed.

Fig. 15 is a fragmentary, longitudinal section of a modified form of my device.

Fig. 16 is a bottom plan view of the modified form illustrated in Fig. 15.

Fig. 17 is a bottom plan, or inner face view of a modified form of the slide portion of my device.

Fig. 18 is a longitudinal section of the slide illustrated in Fig. 17, extended within a holder like that of Fig. 2.

Fig. 19 is a transverse section on the line 19—19 of Fig. 18.

Fig. 20 is a transverse section on the line 20—20 of Fig. 18.

Fig. 21 is an illustration of a novel form of unitary strip or film plate, one end of which is in the form of a ground glass or frosted finish flexible strip.

Fig. 22 is a view similar to that of Fig. 21 but with a projection focusing design formed on the ground glass.

Fig. 23 illustrates a focusing screen, or specifically a ground glass having a projectible design which may be employed for projection focusing with any of the forms of my device.

Fig. 24 illustrates a photo sensitive film plate or strip which may be employed with any of the forms of my device.

Referring to the drawings, particularly Figs. 1 to 8, my "camera slide" is composed essentially of two main portions, one being an elongated relatively thin holder member generally indicated by reference numeral 10, and the other being a complementary, relatively elongated thin slide member generally indicated by the reference numeral 11. Each of these portions may be formed of either metal, plastics or wood.

The holder 10 is formed with longitudinal return bent flanges 12, these flanges being of reduced width adjacent one end of the holder as at 12′, so as to provide abutment shoulders 13 intermediate the length of the flanges. The holder 10 is formed with a rectangular sight opening 14 adjacent one end thereof, the remaining body portion being imperforate, to provide a cooperative mask or light-tight pocket with the slide 11 as will be hereinafter more fully described. Extending transversely of the holder 10, and longitudinally adjustable thereof, are a pair of positioning members 15. These positioning members, as best illustrated in the sectional view of Fig. 5 each comprises a tubular member 16 which lies transversely of and against the outer face of the holder 10, a clamp member 17 which extends through the tubular member and into embracing engagement with the flanges 12, and a screw 18 which extends through the tube 16 into threaded engagement with the clamp 17. By adjustment of the screw 18, the tension of the clamp 17 may be increased or decreased and thus the unit 15 may be moved longitudinally of the holder 10 and set into desired operative engagement in suitable position for purposes which will hereinafter more fully described.

The slide member 11 is adapted to be received slidably within the flanges 12 and 12′ of the holder 10, the slide 11 being also provided with longitudinally extending return bent flanges 19. One terminal end of the slide 11 is bent at an angle thereto to provide the handle portion 20, the opposed end is return bent against the inner face of the slide as at 21, to partially define a seat and terminal abutment for a focusing screen 22, which lies against the inner surface of the slide 11 and embraces the focus screen aperture 23. This focus screen aperture 23 is of rectangular form provided adjacent one end of the slide 11 and is adapted to register with the sight opening 14 of the holder, when the holder 10 and slide 11 are in coextensive engagement with each other. The remaining end portion of the slide 11 is imperforate and is adapted to receive and position a strip of photo sensitive film or film plate 24. As illustrated in Fig. 4, the film 24 may be positioned on the slide 11 by slidably inserting it beneath the flange 19 until it comes into abutment with the transversely extending member 25. A piece of felt, plush or velvet 26 is secured to the transversely extending member 25 which, together with a similar strip 26a, which may suitably be secured to a return bent portion of the handle 20, form a light-tight and light excluding pocket with the imperforate end of the holder 10.

It will be noted that the transversely extending member 25 in addition to providing a transverse stop for the film 24 and holding means for the light-excluding strip 26, additionally provides a transverse stop or frame for the focusing screen 22 together with the portion 21 previously described. The focusing screen 22 which preferably is in the form of a strip of flexible material, may be flexed and inserted beneath the flanges 19 against the inner face of the holder 11 and in embracing engagement over the aperture 23.

The focusing screen 22 may comprise a negative, but preferably is a piece of frosted film, the latter being hereinafter referred to under the conventional designation of ground glass and it will therefore be understood that this term is inclusive of both or either a frosted film or ground glass per se.

In the preferred form of my invention, the ground glass 22 is provided with a design 27 engraved thereon. This design is preferably of a geometric nature and is for the purpose of projection focusing. This design 27 may be of any suitable form, another being such as that illustrated in Fig. 22.

The use of a negative in projection focusing is well known, and the use of a ground glass for view focusing purposes is likewise well known. However, by means of my novel ground glass provided with a projectible design, the same ground glass may be employed for either or both view focusing or projection focusing.

Fig. 10 diagrammatically illustrates a conventional form of enlarger with which my camera slide may be used for purposes of copying, table top photography, enlargement or reduction. As conventional the enlarger in Fig. 10 comprises a lamp housing 28, a frame portion 29 having a recess 30, a bellows 31 and lens 32. As illustrated in Fig. 11 in many of these enlargers the lamp housing 28 may be bodily removed or detached so that as illustrated the remaining portion comprises essentially a camera and may be so used. It will thus be understood that the illustration in Fig. 11 is likewise intended to diagrammatically illustrate a camera. Frame portion 29 as illustrated in Figs. 10 and 11, is open at three sides, and for use with a frame of this general construction, my device may be inserted within the recess 30 as illustrated in Fig. 2, by insertion through the front of the recess 30, with both positioning members 15 engaged to the holder 10. After once being set into firm lateral abutment with the body 29, the positioning members 15 may thereafter be retained in position for successive use without further adjustment. In the event, however, that as is likewise conventional, some enlargers are provided with a portion similar to that of 29 but open only at the two sides, then it will be necessary that one of the positioning members 15 be first removed, my device inserted endwise and thereafter the removed positioning member replaced and clamped into position.

It will thus be understood that my device may be used with a large variety of enlargers and is adjustable for various sizes thereof, and can be engaged thereto or within, or over a similar negative carrying or receiving stage and adjusted thereto by manipulation of the members 15 which serve as positioning and clamping members. The slot 30 of the structural member 29 will likewise be understood to diagrammatically illustrate the slide receiving aperture of a conventional magic lantern or projector.

In the operation of my device, the slide 10 is slidably engaged within the flanges 12—12' of the holder 11, after a suitable focusing screen has been positioned therein. Thereafter a film plate 24, as illustrated in Fig. 4 is inserted in the slide in a dark room, and the slide and holder thereafter brought into coextensive engagement as illustrated in Fig. 2 to position the film plate 24 in the light-tight pocket provided between and formed by the imperforate portions of the holder and slide. Thereafter my camera slide unit is ready for use and may be inserted within the slot 30 of the enlarger of Fig. 10, as illustrated by the dotted lines in the detailed view of Fig. 2, with the positioning clamps 15 in embracing engagement with the structural member 29.

In projection focusing, by means of an enlarger such as that of Fig. 10, and with either the employment of a negative as a focusing screen or preferably my novel focusing screen 22 provided with a projectible design 27, the projector lamp is turned on as illustrated in Fig. 12, and the design 27 of the ground glass 22 projected on to the object which it is desired to photograph or copy 33. As illustrated in Fig. 14, the design 27 carried on the ground glass 22 is projected in the form of an image 27', and by suitable conventional focusing manipulation, brought into desired focus, and the area or object desired to be copied properly brought under and centered by means of the projectible design 27. Thereafter the lamp 34 is turned off, and the slide 10 moved laterally into non-coextensive engagement with the holder 11 and into limiting position of the handle 20 against the abutment shoulders 13, as illustrated in Fig. 3 and Fig. 13, to bring the film 24 into register with the sight opening 14 of the holder and into exposure position. Here external lighting conditions may be suitably adjusted for proper exposure, and after exposure the slide returned into coextensive engagement with the holder, the entire camera slide removed and the film unloaded in a manner similar to that shown in Fig. 4 in a dark room.

By provision of my novel device it will be evident that sharp focusing may be simply effected, and without the necessity for removing the focusing screen, the film to be exposed is immediately thereafter moved into exposure position, and since my device is so constructed and arranged that the film is maintained in co-planar position with the ground glass, when the film is moved into exposure position it will be embraced over the same exposure area and be retained in the same plane as was the ground glass, and thus a sharp and clear photograph will be obtained of equal definition as that of the projected design 27.

If desired, a lamp housing of an enlarger or magic lantern need not be employed but simply an ordinary spot light or other suitable light of proper intensity in the position of the lamp 34. On the other hand if the lighting conditions are suitable, the use of a spot light or lamp 34 may be entirely dispensed with and the ground glass either with or without a design 27 may be used for focusing in conventional ground glass viewing manner. Although not illustrated, it will be apparent that my camera slide device may be similarly employed as a camera back and utilized for focusing and photography in the manner or manners herein described.

Fig. 9 diagrammatically illustrates a transverse section of a modified form of construction which may be suitable when my device is formed of wood. Thus, for example, this form may comprise the holder 35 and the slide 36, the latter being provided with beveled edges 37 slidably received within the slot provided by the inclined flanges 38. In this form the transversely extending positioning guides may be in the form of fixed members 39 secured to the outer face of the holder 35 by means of a screw 40.

The modified form shown in Figs. 15 and 16, is generally similar to the form of Figs. 1 to 8, but in this instance the holder 41 is provided with fixed positioning members 42 fixedly secured, as by welding, to the outer face of the holder body 41, the positioning members 42 being suitably in the form of the illustrated angle pieces. This simplified form of construction is adapted for use with an enlarger of a given size, and will often be found suitable as an accessory to be sold for or together with a specific form and size of enlarger.

Figs. 17 to 20 illustrate a modified form of construction wherein the holder 10 is identical in all respects with the holder illustrated in Figs. 1 to 8. The slide 11' is likewise generally similar in all respects to the slide 11 illustrated in Figs. 1 to 8 with the exception that the member 25 of Figs. 1 to 8 which is secured to and extends transversely of the inner face of the slide 10, and provides an end stop for the film strip, is replaced in the form of Figs. 17 to 20 with the transverse member 43, which is elevated above the inner face of the slide 11' and is secured to and between the longitudinal flanges 19' of the slide. The purpose of this construction is to permit insertion of a unitary strip such as that shown in Fig. 21 or 22. The portion 43 is provided with a pair of felt or light excluding brushes, one extending upwardly from the inner face of the slide as indicated at 44, similar to the light excluding strip 26 of the previous forms, and in addition there is the downwardly extending strip 45. This downwardly extending strip 45 while laying against the inner face of the slide 11' permits passage of or insertion of a unitary strip such as that illustrated in Fig. 21 or 22.

The strip illustrated in Fig. 21 comprises a sensitized film plate portion 46 and an integral frosted or ground glass focusing screen 47. Fig. 22 illustrates a strip similar to Fig. 21 having a sensitized portion 48 and a ground glass focusing screen portion 49, this ground glass portion being provided with a geometric design 50 similar in character to that shown and previously described with respect to focus screen 22. Any other design of a similar nature and for a similar function may, of course, be provided.

If desired I may, with the form of my device shown in Figs. 17 to 20, use the separate form of focusing screen 22 and sensitized film 24 as illustrated in Figs. 23 and 24 respectively, in a manner and to the same end fully as effective as with the unitary forms of Figs. 21 and 22. It will also be understood that the illustrations in Figs. 21 to 24 are shown dimensionally reduced in proportion to the slides and holders illustrated in the remaining figures of the drawings, merely for convenience in illustration. Likewise both the film and the camera slide device of my invention, and the various illustrated forms thereof, may be made in proportion in suitable size for the purpose of use with now conventional standard sizes or films, or for any specially designed newly provided form of film such as for example the unitary strip forms of Figs. 21 and 22.

It will also be understood that the form of construction illustrated in Figs. 17 to 20 may be provided with fixed holder positioning members such as illustrated in Figs. 15 and 16 in place of the longitudinally adjustable ones illustrated.

It will also be understood that certain details of my camera slide may be modified without departing from the spirit of my invention. For example, instead of the longitudinal extending flanges 19—19 for holding and positioning the focusing screen and/or sensitized film on the slide 11 or 11', it will be evident without necessity for further illustration that pairs of transversely extending flanges may be secured to the inner face of the slide member, or other positioning means such as hinged frame portions and the like may be provided.

I claim as my invention:

1. A photographic device of the class described comprising a relatively thin elongated holder member formed with a single sight aperture therethrough, the remaining face portion being imperforate, and a complementary elongated slide member formed with a focus screen aperture including a focusing screen carrying a projectible design extended over the aperture adjacent one end thereof adapted to register with said sight opening, the slide member including photographic film holder means adapted to provide a seat for said film co-planar with said screen adjacent the other end portion thereof and adapted thereat to form a light-tight pocket with the imperforate end portion of the holder and between the adjacent faces of said portions.

2. A photographic device of the class described comprising a thin elongated holder member formed with a sight aperture adjacent one end thereof, the surface area of the opposed end portion thereof being imperforate, and a complementary elongated member in longitudinally slidable operative engagement therewith, said slidable member being formed with a focus screen aperture including a focusing screen carrying a projectible design extended over the aperture adjacent one end thereof adapted to register with said sight opening and including photographic film engagement and positioning seat means co-planar with said screen adjacent the opposed end thereof adapted to form a light-tight pocket with the imperforate end portion of said holder, and means on the outer surface of the holder member for positioning the device in photographic relationship rearwardly of a lens.

3. A photographic device of the class described comprising a relatively thin elongated holder member formed with a sight aperture adjacent one end thereof, the surface area of the opposed end portion being imperforate, and a slide member for slidable engagement with said holder within flanges extending longitudinally of the holder, the slide member being formed with a focus screen aperture adjacent one end thereof adapted to register with said sight opening, the surface area of the opposed end thereof being imperforate, said slide including a focus screen embodying a projectible design against the inner face thereof and over its aperture and means for seating a photographic film over the inner face of the imperforate portion thereof in the same plane as said screen and including means thereat for forming a light-tight pocket with the imperforate portion of the holder, means adjacent the inner face of the holder for limiting slidable movement of the slide member, and means extending from the outer surface of said holder for engaging it in fixed photographic relationship rearwardly of a lens at the focal plane of an enlarger, projector, camera, and the like device.

4. A photographic device of the class described comprising a relatively thin elongated holder member formed with a sight aperture intermediate the ends thereof and a complementary elongated slide member in slidable engagement therein formed with a focus screen aperture adjacent one end thereof adapted in one position to register with said sight opening and including co-planar photographic film engagement seat means adjacent the opposed end thereof and adapted thereat and in said position to be shielded by and to form a light-tight pocket with the remaining portion of said holder, and a focusing screen carrying a projectible design positioned against the face of said slide and embracing the aperture thereof.

5. A photographic device of the class described comprising a relatively thin elongated holder member formed with a sight aperture adjacent one end thereof and a complementary elongated slide member movable relative to and within the holder formed with a focus screen aperture adjacent one end thereof adapted in one operative position to register with said sight opening, said slide including photographic film engagement means adjacent the opposed end thereof and adapted thereat and in said operative position to form a light-tight pocket with the remaining portion of said holder and between their opposed adjacent surfaces, and a ground glass focusing screen positioned against the inner face of said slide and embracing the aperture thereof, said ground glass being formed with a focusing design thereon.

6. A unitary focus screen and photographic film carrying device of the class described comprising an elongated holder member formed with a sight opening adapted to be positioned in photographing relationship rearwardly of a lens, and a complementary slide member formed with a focus screen aperture including a focusing screen carrying a projectible design extended over the aperture adjacent one end and including co-planar film seating means adjacent the opposed end, said slide being adapted to be successively moved relative to and in engagement with said holder whereby in one position the focus screen thereof is in register with the sight opening of the holder and the film seating portion forms a light-tight pocket with and is shielded against inadvertent exposure by the remaining imperforate portion of the holder, and in another position the film seating portion of the slide is in register with the sight aperture of the holder.

7. A unitary focus screen and photographic film carrying device of the class described comprising a relatively thin elongated holder member formed with a sight opening therethrough and adapted to be positioned in photographing relationship rearwardly of a lens, the opposed end portion thereof being imperforate, and a complementary slide member formed with a focus screen aperture adjacent one end and seating a focusing screen thereover embodying a projectible design, the opposed end portion of said slide being imperforate and including means adjacent the opposed end, for seating photographic film in co-planar relationship with said focusing screen, said slide being adapted to be successively brought into engagement with said holder whereby the focus screen aperture thereof is in register with the sight opening of the holder and the film seating portion forms a light-tight pocket with the imperforate end of the holder, and thereafter into non-coextensive engagement whereby the film seating portion of the slide is in register with the sight aperture of the holder for photographic exposure of contained film.

8. A unitary focus screen and photographic film carrying device of the class described comprising a relatively thin elongated holder member formed with a sight opening adapted to be positioned in fixed photographing relationship rearwardly of the lens of an enlarger, projector, camera and the like apparatus, and a complementary thin slide member engaged within and movable relative to said holder formed with a focus screen aperture adjacent one end and including a ground glass focusing screen including a projectible design thereover and co-planar film seating means adjacent the opposed end for positioning photographic film against said latter end portion, said slide being adapted to be successively moved relative to said holder whereby in one operative position the focus screen aperture thereof is in register with the sight opening of the holder and the film seating portion is shielded by and forms a light-tight pocket with the opposed end of the holder, and in another operative position the film seating portion of the slide is brought into exposure position in register with the sight aperture of the holder.

9. A unitary focus screen and photographic film carrying device of the class described comprising an elongated holder member formed with a sight opening adjacent one end thereof adapted to be positioned in photographing relationship rearwardly of a lens, the opposed end portion being imperforate, and a complementary slide member formed with a focus screen aperture adjacent one end and including means for holding a focus screen extended thereover and co-planar photographic film seating means adjacent the opposed and imperforate end thereof, said slide being adapted to receive and position an elongated unitary strip one end portion of which is in the form of a focusing screen adapted to lie over the focus screen aperture and the other end of which is a photographic film, said slide and contained strip being further adapted to be successively brought into co-extensive engagement with said holder whereby the focus screen aperture thereof is in register with the sight opening of the holder and the film seating portion forms a light-tight pocket with the opposed end of the holder, and thereafter into non-coextensive engagement with the film seating portion of the slide in register with the sight aperture of the holder.

10. A unitary focusing screen and photographic film carrying device, comprising: an elongated holder member having a sight opening extending therethrough; an elongated slide member movable relative to and within said holder member; a focusing screen carried by said slide member arranged to register with said sight opening in one operative position of said slide member relative to said holder member, said focusing screen having a projectible design thereon; and means on said slide member longitudinally spaced from said focusing screen for supporting a photographic film in a plane common to that of said focusing screen with said photographic film shielded by said holder member against inadvertent exposure, said slide member having another operative position relative to said holder member in which said photographic film is in registration with said sight opening.

WILLIAM L. APPLING.